: 3,015,852
PROCESS OF SPHEROIDIZING IRREGULARLY SHAPED PARTICLES
Daniel Jakobus Nicolas Hoffman, Menlo Park, Pretoria, Transvaal, and Thomas Barry Beeton, Muckleneuk, Pretoria, Transvaal, Union of South Africa, assignors to South African Iron and Steel Industrial Corporation, Limited, Pretoria, Transvaal, Union of South Africa
Filed Mar. 26, 1958, Ser. No. 724,037
Claims priority, application Union of South Africa Apr. 4, 1957
6 Claims. (Cl. 18—48)

The present invention relates to an improved process for the spheroidizing of irregularly shaped oxidizable solid ferro-silicon particles.

An object of the invention is the provision of an improved process for the conversion of oxidizable solid ferro-silicon particles of irregular shape into spherical or spheroidal particles, or particles having rounded edges and rounded corners, and it is in this sense that the expression "spheroidizing" is employed in the present specification.

Another object of the invention is the provision of a process for the preparation of spheroidized smooth particles of ferro-silicon or other spheroidizable material, such as are particularly suitable for being suspended in water or other liquid medium for the preparation of so-called heavy media of particularly high specific gravity and relatively low viscosity for the separation of minerals from gangue, or for splitting minerals up into fractions of different specific gravity by a heavy medium separation process.

Other objects of the invention will be apparent from the description which follows:

In accordance with one aspect of the invention, a process for the conversion of irregularly shaped oxidizable solid ferro-silicon particles to smooth spheroidized solid particles comprises the steps of passing the particles through a high temperature flame produced from a nozzle by injecting air or air enriched with oxygen centrally into surrounding atmosphere of combustible gas in which flame they are melted at least at their surface, and thereafter cooling the thus treated particles. The agglomeration of the said particles and their caking on the walls of the processing vessel, insofar as such vessels are employed, should be avoided as far as possible throughout the process.

According to a preferred embodiment of the invention, the particles to be spheroidized are blown into a flame adequate to set up the aforesaid conditions by introducing the said particles into a nozzle used for producing the said flame. For example, the particles to be spheroidized may be injected or aspirated into a central passage of a flame-producing nozzle, through which, e.g. air or air enriched with oxygen or a mixture of these gases with a relatively small proportion of combustible gas to improve the flame characteristics, is blown in, while a combustible gas, e.g. coke-oven gas, producer gas, water gas, natural gas, or other suitable gas, is introduced through a concentric surrounding annular passage. This method of operation prevents any too far-going oxidation of the material undergoing spheroidizing, because since the combustible gas surrounds the oxygen-containing gas, a reducing zone is produced towards the periphery of the flame, through which zone the particles must pass prior to being cooled. If desired, the nozzle tip may be water-cooled.

It is advantageous to direct the flame vertically downwards. It should preferably be well defined and is advantageously pencil-shaped.

When desired or required, the sub-divided material to be spheroidized and/or the gases to be employed for the process may be preheated.

The invention will be described in greater detail hereinafter with reference to the accompanying drawing in which.

Figure 1:
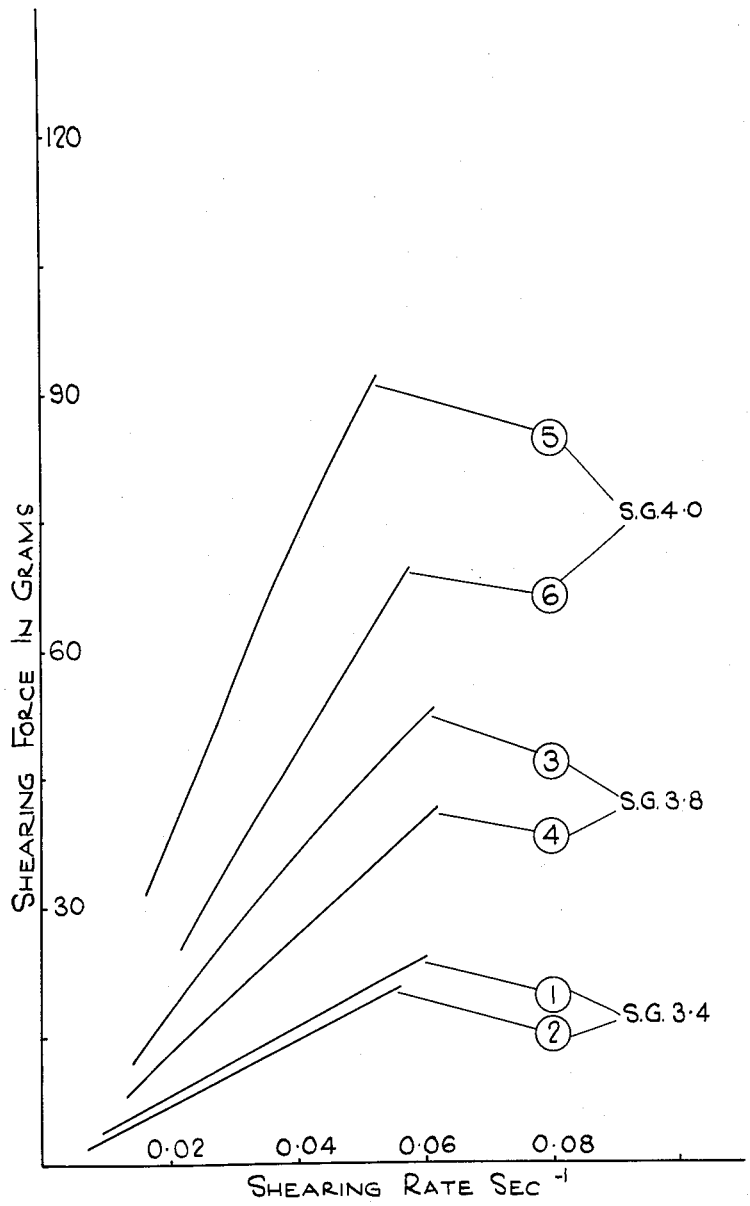
FIG. 1 is a graph illustrating the superior properties of products of the invention.

The apparatus provided for carrying out the said process comprising a shaft-furnace having a nozzle arrangement as above defined through which the particles enter the furnace. The cross-sectional area of the furnace should be such as to allow of at least the surfaces of the particles cooling down to such an extent that they do not adhere substantially to the walls of the shaft when coming into contact with them. In a preferred embodiment, the walls of the furnace are, moreover, constructed of or coated or clad with such material as will wholly or substantially prevent sticking of the particles to the walls such, for example, as polished stainless steel or vitreous enamelled steel. The walls may, however, also be lined with refractories when care is taken to prevent, as far as possible, the particles from coming into contact with the wall surfaces.

Other means are preferably provided in the said shaft for setting up suitable conditions. Thus, for example, an annular slot may be provided in the cover of the furnace close to its periphery for the admission of a downwardly directed current of inert or other suitable gas to form a curtain of cool gas separating the inner central hot zone of the shaft from its walls.

Means may be provided at various levels in the said shaft for the introduction of additional heating, cooling or other conditioning gases through means in the periphery of the said shaft, e.g. through slots, nozzles or the like. The spheroidized particles may, if desired, be ultimately discharged into water and/or other cooling liquid In order to recover the very fine dust particles remaining in suspension in the effluent, suitable separating means and devices should be included in the system. For example, the space between the surface of the water or other liquid and the shaft may be curtained off by an annular spray of water or other suitable liquid, or a scrubbing zone may be provided. A suitable wetting agent may be added to the spraying or dust-separating liquid, when desired or required. As an alternative, dry cooling and separation or collection of the product may be considered. This method is particularly advantageous in circumstances where the spheroidized material is required in the dry condition, as the aforesaid wet method would then entail considerable drying costs. The wet method is also less advantageous than the dry method from the point of view of heat economy, during the production of the spheroidized product. The air used for dry cooling can be used with advantage as preheated air for the production of the flame.

Ferro-silicon containing about 10 to 25%, and preferably 12 to 17% of silicon is very suitable for the treatment of the invention. Small amounts of other alloying constituents, such, for example, as copper or aluminium, which may have a beneficial effect on the spheroidizing or other qualities of the product, e.g. its corrosion resistance, may be present or incorporated therein. The initial material may, for example, be mechanically ground and then subjected to the spheroidizing treatment.

Particles having a size distribution range up to 200 mesh, and particles of larger sizes, and preferably materials containing both particles of a size below and above 200 mesh may be treated. It has been observed that the smaller particles are apparently often melted throughout, whereas larger particles are often only melted superficially.

It has been found that the particles of ferro-silicon or like material spheroidized in accordance with the invention give particularly advantageous results when suspensions in liquids, in particular, water or other aqueous media are prepared therefrom, more especially for use as heavy media for heavy medium separation processes, e.g., as applied to the separation of minerals.

It is important that effective heavy media having very high specific gravities can be prepared in accordance with the present invention, e.g. of up to 4 with ferro-silicon spheroidized in accordance with the invention.

We have, moreover, observed that the suspensions prepared in accordance with the present invention, often have physical properties rendering them superior in respect of their use as separating media to the best products produced by atomization commercially available up to the present.

Thus, if these products are compared, it is found that when suspensions of the same specific gravities are prepared from the products to be compared, the suspensions in accordance with the present invention often have a lower viscosity than suspensions of corresponding specific gravity prepared from the best corresponding materials produced by atomization hitherto commercially available.

This is shown by the following experiments in which a commercially available atomized ferro-silicon having a particle size distribution ascertained by wet screen analysis

*Standard Tyler Screen openings*

| | Percent |
|---|---|
| +65 mesh | 0.9 |
| +100 mesh | 5.8 |
| +150 mesh | 8.6 |
| +200 mesh | 16.0 |
| +325 mesh | 24.0 |
| +325 mesh | 44.7 |
| Total | 100.0 | was compared with a ferro-silicon spheroidized in accordance with the present invention and adjusted to the same particle size distribution for the purpose of creating comparable conditions.

Suspensions of the two types of ferro-silicon to be compared, which are identified by the following numbers were prepared in various comparable specific gravities as follows:

| Specific gravity | Parts by weight | | Commercial Atomized Ferro-silicon | Spheroidized Ferro-silicon according to the invention |
|---|---|---|---|---|
| | Ferro-silicon | Water | | |
| 3.4 | 82.63 | 17.37 | No. 1 | No. 2 |
| 3.8 | 86.26 | 13.74 | No. 3 | No. 4 |
| 4.0 | 87.8 | 12.2 | No. 5 | No. 6 |

Referring now to the attached graph in FIG. 1:

The axes represent two scalar quantities, namely, shearing force in grams weight, and shearing rate in unit length per second. The unit length in this case is not specified as it is a constant which depends upon the apparatus used. The graph embodying the plot of these two quantities is, however, a well known method of obtaining a measure of the viscosimetric properties of a suspension.

The values plotted in the graphs were obtained by means of a modified "Stormer" viscosimeter, and will be readily evident to those skilled in the art and science of the use of aqueous heavy media suspensions.

The curves for each of the suspensions referred to above bear the same numbers for identification purposes.

It will be noted that in all cases shown in the graph, the product spheroidized according to the present invention shows better viscosimetric properties than the aforesaid commercially available product.

The adjustment of proper particle size distributions is a factor of particular importance in the production of heavy media.

The process has been employed with particular advantage for the beneficiation of hematite iron ores and other oxidic iron ores at specific gravities of the medium of 3.6 or more. On a batch scale, we have been successful in carrying out separations with a medium prepared in accordance with the invention having a specific gravity of the order of 4.

The invention is also applicable with advantage for other purposes in which spheroidized particles are to be employed, e.g. for the production of spheroidized catalyst particles which are to be employed in a fluidized or streaming fluidized state, e.g. iron catalysts to be employed in a Fischer-Tropsch fluidized or streaming fluidized type of reaction.

Figure 2:
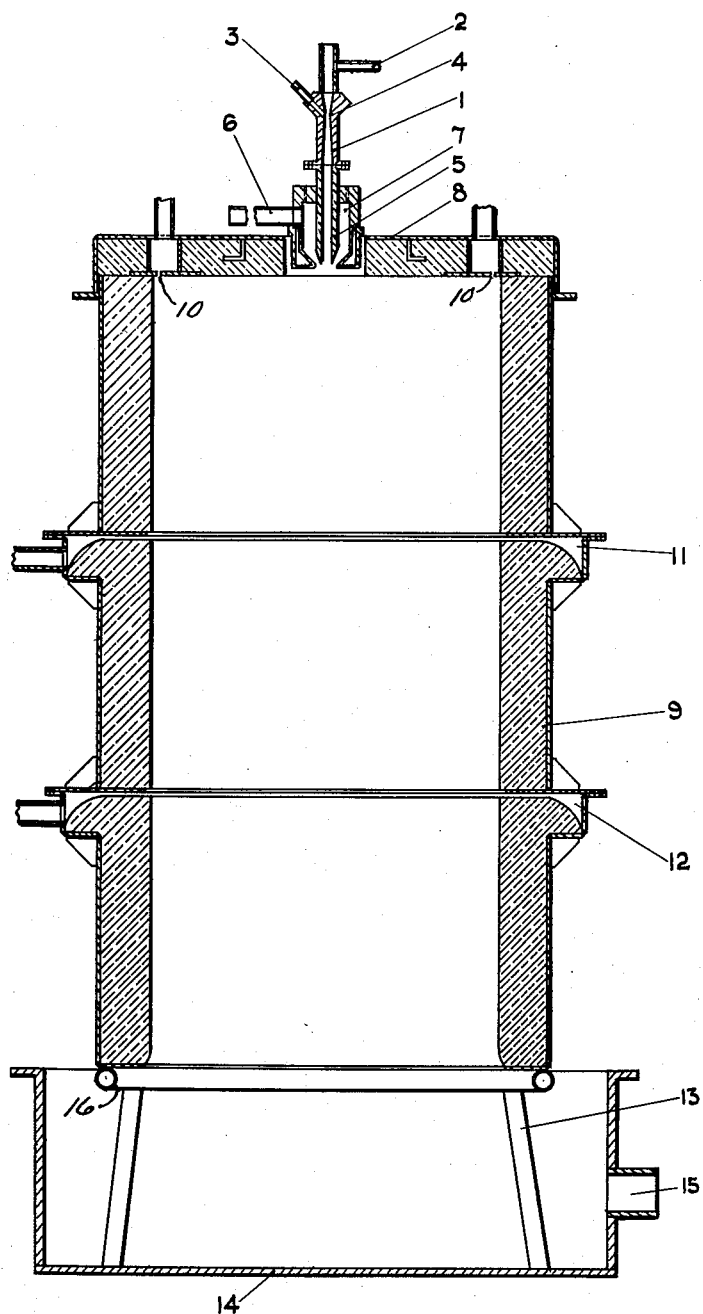
FIG. 2 illustrates in vertical section apparatus for effecting a wet-quenching operation according to the invention.

An apparatus for carrying out the process in accordance with the present invention with wet quenching will be further described purely by way of example, with reference to FIG. 2 of the accompanying diagrammatic drawing which shows a vertical section through the said apparatus.

Referring to the drawing, 1 is the central pipe of a nozzle through which air is blown in from the top and oxygen is blown in from pipe 2. 3 is a pipe for the introduction of ground ferro-silicon. The said pipe discharges into a venturi 4 which aspirates the material into the oxygen-enriched air current. The mixture of oxygen-enriched air and ferro-silicon passes through the central pipe 1 of the nozzle. 5 is the tip of the said central pipe. 6 is a pipe for introduction of combustible gas, e.g. coke-oven gas, into an annular chamber 7 surrounding the nozzle 1. The said annular chamber may be jacketted for water cooling. The nozzle assembly is inserted centrally into the furnace cover 8 at the top of the shaft 9, which has an internal diameter of 1 ft. 9 inches. The cover and the shaft walls are lined with refractory material. If desired or required, a current of cold air or other cooling gas and/or heating gas may be introduced through an annular slot 10 in the cover 8 close to the walls of the shaft furnace. Heating and/or cooling gases may also, if desired or required, be introduced through slots or nozzles from the annular conduits 11 or 12. The shaft 9 is open at the bottom and rests on a water cooled stand 13 above a water bath 14 provided with an overflow 15 in which bath the spheroidized ferro-silicon is collected. An annular spray 16 is provided for avoiding or mitigating dust nuisance and aiding the collection of the fine dust material.

The following temperatures of the particles undergoing spheroidization were observed with an optical pyrometer, but it should be understood that, owing to the limitations of the instrument, the temperatures indicated are not necessarily the true temperatures and likely to be somewhat low, i.e.

| | ° C. |
|---|---|
| In the flame at the top | 1300 to 1400 |
| In the flame lower down | About 1200 |
| In the middle of the furnace | About 1050 to 1100 |

The flame temperatures are considerably higher, and we have found by theoretical calculation that they are probably of the order of 2000° C.

Figure 3:
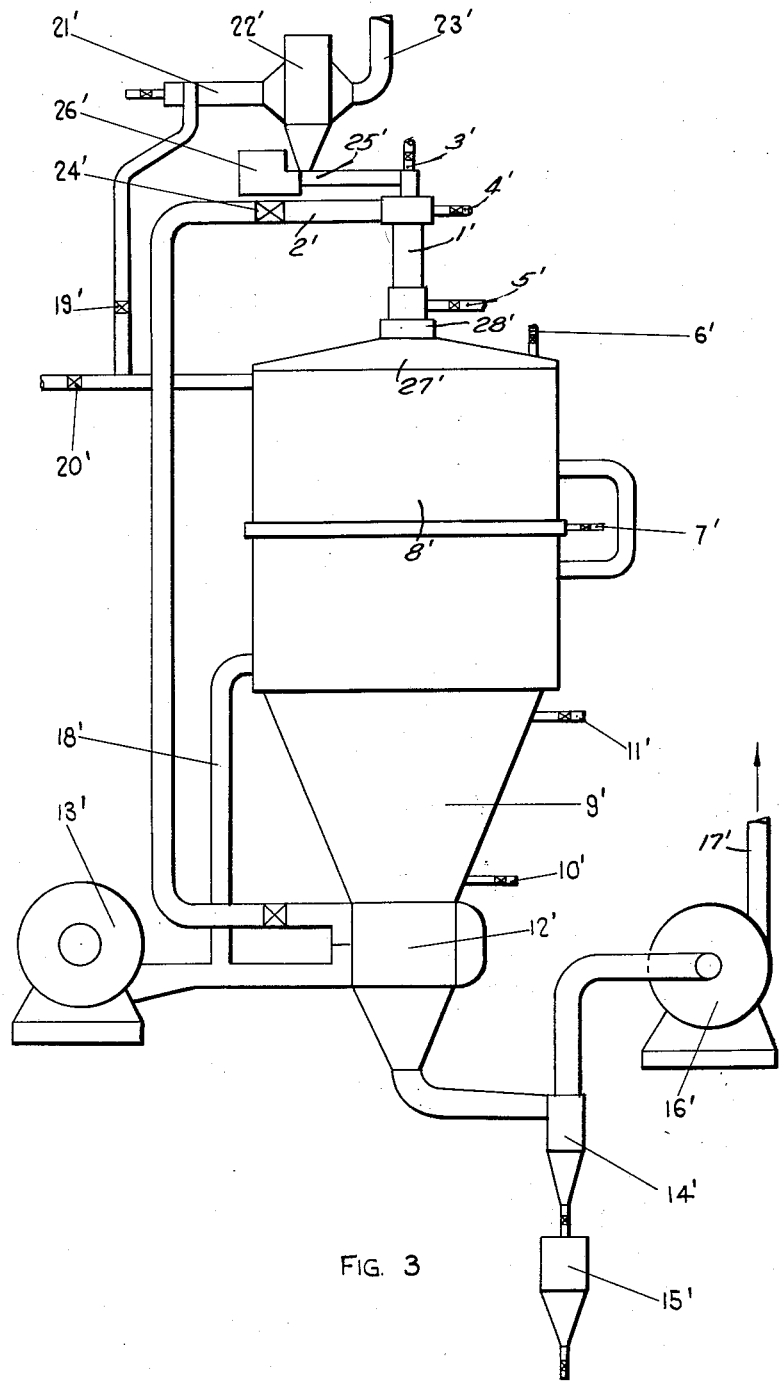
FIG. 3 is an elevation of apparatus for effecting a dry process according to the invention.

An apparatus for carrying out the dry process in accordance with the present invention will now be further described by way of example, with reference to FIG. 3 of the accompanying drawing, which shows diagrammatically an elevation of the said apparatus. The invention is, however, not limited to the example given.

Referring to FIG. 3, 1' is the burner assembly, 2' is the preheated air inlet to the burner, 3' is the primary combustible gas inlet to the burner, and 4' is the oxygen enrichment inlet to the burner. 5' is the secondary combustible gas inlet to the burner and 6' and 7' are inlets leading to ring slots for the purpose of admitting air or other gas for atmosphere control. 8' is the furnace body proper consisting of two air cooled double walled steel cylinders. Bolted to the bottom of these is a double walled water cooled conical section with water inlet 10' and outlet 11'. Attached to the bottom of this conical section is a heat exchanger 12'. The purpose of this is, firstly to cool the furnace gases passing downwards and thus at the same time, the spheroidized product contained in them, and secondly, to preheat the air used for combustion which is blown through the heat-exchanger by means of a blower 13'. The cooled gases and spheroidized product now pass into a cyclone dust separator 14', so designed as to collect the smallest particle in the product. The product from the cyclone is collected in container 15', from which it is, from time to time, withdrawn. The flue gases pass out of the cyclone 14' and are drawn through the flue extraction fan 16' from where they are exhausted to atmosphere via the stacks 17'.

Part of the air provided by fan 13' is utilized for cooling the top cylinders (which could be water cooled if so desired) via pipe 18' and the resulting hot air is either partially or wholly exhausted to atmosphere via valve 20'. The remaining hot air is used via valve 19' to feed burner 21' which in turn is used for preheating the oxidizable material which is to be spheroidized in heat exchanger 22' while the resulting flue gas is exhausted to atmosphere via the stack 23'.

The flow of hot air to the main burner 1' is controlled by means of air valve 24'. The material to be spheroidized is fed into the burner by some suitable means via feed pipe 25'. In this case, for example, an archimedes screw feed was used driven by motor 26'. The furnace lid 27' is water cooled as also the burner nozzle 28'.

What we claim is:

1. A process for spheroidizing irregularly shaped ferro-silicon particles which comprises passing a gas containing free oxygen in at least the proportion contained in air into the central passage of a downwardly directed flame-producing nozzle, introducing a combustible gas through an annular passage in said nozzle surrounding the said central passage at its outlet, thus producing a downwardly directed flame having a reducing zone at least towards its perimeter, feeding the irregularly shaped ferro-silicon particles to be spheroidized into the said central passage, causing the said particles to pass through the said flame and its reducing zone thereby melting them at least at their surface and allowing the thus spheroidized particles to enter a cooling zone.

2. A process for spheroidizing irregularly shaped ferro-silicon particles as claimed in claim 1 in which the irregularly shaped ferro-silicon particles are passed through a downwardly directed pencil-shaped flame.

3. A process for spheroidizing irregularly shaped ferro-silicon particles as claimed in claim 1 in which the ferro-silicon particles to be spheroidized contain 10-25 percent of silicon.

4. A process for spheroidizing irregularly shaped ferro-silicon particles as claimed in claim 1 in which the ferro-silicon particles to be spheroidized contain a small amount of an alloying constituent selected from the group comprising aluminum and copper.

5. A process for spheroidizing irregularly shaped ferro-silicon particles as claimed in claim 1 which comprises spheroidizing a mixture of ferro-silicon particles of sizes below 200 mesh.

6. A process for spheroidizing irregularly shaped ferro-silicon particles as claimed in claim 1 which comprises spheroidizing a mixture of ferro-silicon particles of a particle size distribution suitable for use in the preparation of heavy suspension media for ore beneficiation.

References Cited in the file of this patent

UNITED STATES PATENTS

| | | |
|---|---|---|
| 1,513,622 | Manning | Oct. 28, 1924 |
| 2,044,680 | Gilbert | June 16, 1936 |
| 2,186,659 | Vogt | Jan. 9, 1940 |
| 2,421,902 | Neuschotz | June 10, 1947 |
| 2,431,884 | Neuschotz | Dec. 2, 1947 |
| 2,676,892 | McLaughlin | Apr. 27, 1954 |
| 2,838,881 | Plumat | June 17, 1958 |